United States Patent Office 3,455,887
Patented July 15, 1969

3,455,887
COPOLYMERS OF VINYL ESTERS OF LOWER ALKANOIC ACID, VINYL ESTERS OF TERTIARY ALKANOIC AND LOWER ALKYL METHACRYLATES
Eli Levine, Hillside, N.J., assignor to Celanese Corporation, New York, N.Y., a corporation of Delaware
No Drawing. Filed June 21, 1966, Ser. No. 559,108
Int. Cl. C08f 15/40
U.S. Cl. 260—78.5                18 Claims

ABSTRACT OF THE DISCLOSURE

Novel copolymers comprising (1) at least one vinyl ester of a straight chain lower alkanoic acid, e.g. vinyl acetate (2) at least one vinyl ester of a member of a particular class of tertiary alkanoic acids and preferably a mixture of such esters, said tertiary acid esters being represented by the general formula

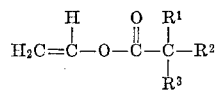

wherein $R^1$, $R^2$ and $R^3$ each represent a straight or branched chain lower alkyl group having from 1 to 6 carbon atoms and (3) at least one lower alkyl methacrylate, e.g. methyl methacrylate.

---

This invention relates to novel copolymers, to processes for the preparation thereof, and to compositions containing them.

More particularly, this invention relates to novel copolymers comprising (1) at least one vinyl ester of a straight chain lower alkanoic acid, e.g., vinyl acetate, (2) at least one vinyl ester of a member of a particular class of tertiary alkanoic acids, and preferably a mixture of such esters, said tertiary acid esters being represented by the general formula

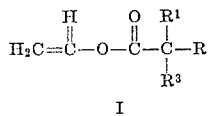

I wherein $R^1$, $R^2$ and $R^3$ each represent a straight or branched chain lower alkyl group having from 1 to 6 carbon atoms, inclusive, e.g., methyl, ethyl, propyl, isopropyl, n-butyl, isobutyl, t-butyl, n-pentyl, n-hexyl, and the like, with the sum total of the carbon atoms in the alkyl groups represented by $R^1$, $R^2$ and $R^3$ being 8, and (3) at least one lower alkyl methacrylate, e.g., methyl methacrylate. This invention further relates to aqueous emulsions of such copolymers, and to coating compositions containing such emulsion copolymers.

Copolymers of vinyl acetate and mixtures of the vinyl esters of tertiary alkanoic acids described hereinabove (and in particular the mixture of monomers designated as VV10 Vinyl Monomer by Shell Chemical Company) are known in the art and have many useful properties. For example, paints which incorporate these copolymers as resinous binders are said to have outstanding bulk and film properties, including good storage and freeze-thaw stability (this last property being enhanced by the inclusion of small amounts of acrylic acid in the copolymer), color acceptance and uniformity, scrubability and alkali resistance. In addition, paints containing these polymers may be formulated to give an excellent semi-gloss finish, which is highly desirable for many applications.

The very places, however, where the use of a water base semi-gloss paint would be most desirable, e.g., in kitchens and bathrooms, have proven to be a hostile environment to paints containing known copolymers of the type in question. In these areas, steam and water vapor frequently come in contact with painted surfaces. When this happens to paint films containing these known copolymers, dulling quickly develops. Furthermore, upon prolonged contact wtih condensed water vapor the paint film exhibits excessive softness or tackiness.

Under microscopic examination the thus-dulled paint film exhibits a network of closely spaced hair-line cracks, indicating that its copolymer component may lack adequate dimensional stability under wet conditions. But whatever the reasons for this behavior, it is evident that paints containing these known copolymers are not suitable for use in areas where frequent or continuous exposure to steam or water vapor can be expected.

The present invention provides a simple yet effective solution to this problem. More particularly, it has now been discovered that if these known copolymers are modified by incorporating particular amounts of at least one lower alkyl methacrylate therein, novel copolymers are obtained which, in turn, can be formulated into excellent semi-gloss paints having improved resistance to dulling and softening on exposure to steam or water vapor.

It is, therefore, an object of the present invention to provide novel copolymers.

It is also an object of the present invention to provide novel compositions, and particularly coating compositions, containing said copolymers.

A further object of the present invention is to modify copolymers of at least one vinyl ester of a straight chain lower alkanoic acid and at least one vinyl ester of a member of a particular class of tertiary alkanoic acids of the type specified herein by copolymerizing with said vinyl ester monomers particular amounts of at least one lower alkyl methacrylate.

Another object of the present invention is to provide novel aqueous emulsions containing said vinyl ester copolymers.

A still further object of the present invention is to provide novel semi-gloss coating compositions containing said vinyl ester copolymer emulsions which, in film form, exhibit improved resistance to dulling and softening on exposure to steam or water vapor.

These and other objects of the present invention will be discussed in greater detail hereinbelow.

The novel copolymers of the present invention can be prepared by any method customarily employed to prepare vinyl ester-containing polymers, which includes solution, bulk and emulsion techniques. The latter procedure, however, is preferred.

Standard emulsion polymerization procedures customarily involve admixing all or part of the monomers being polymerized with water, surfactants or emulsifying agents, a polymerization catalyst or initiator, and, in most cases, a protective colloid-forming substance. This mixture is then heated to polymerization temperature, with continued stirring, for the time necessary to substantially completely form the polymer emulsion. If desired, all or part of the monomers, surfactants, catalyst and protective colloid can be added incrementally or continuously over a given period of time, rather than all at once, to the polymerization sphere. The resulting emulsion, upon cooling and filtration, is ready for use.

The surfactants or emulsifying agents employed can be any of the anionic, cationic or non-ionic materials usually employed for this purpose, as well as mixtures thereof. Preferably, although not necessarily, a predominant amount, i.e., from about 50% to about 100% of the surfactant used, will comprise a polyether containing at least four, and preferably more than four, ether linkages. The total amount of surfactant or emulsifying agent used will generally range from about 1% to about 10% by weight, based on the total weight of monomers present.

A particularly preferred class of polyether surfactants or emulsifying agents encompasses ethylene oxide and propylene oxide condensates in general, e.g., straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, which series can be represented by the general formula

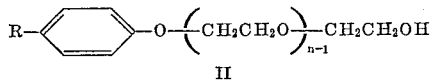

II wherein R represents an alkyl radical and $n$ represents the number of mols of ethylene oxide employed, included among which are alkylphenoxypoly(ethyleneoxy)ethanols having alkyl groups containing from about 7 to about 18 carbon atoms, inclusive, and having from about 4 to about 100 ethyleneoxy units, such as the heptylphenoxypoly(ethyleneoxy)ethanols, nonylphenoxypoly(ethyleneoxy)ethanols and dodecylphenoxypoly(ethyleneoxy)ethanols; the sodium, potassium or ammonium salts of the sulfate esters of these alkylphenoxypoly(ethyleneoxy)ethanols; alkylpoly(ethyleneoxy)ethanols; alkylpoly(propyleneoxy)ethanols; octylphenoxyethoxyethyldimethylbenzylammonium chloride; polyethylene glycol 5-dodecylthioether; the "Tweens," which are polyoxyalkylene derivatives of hexitol (including sorbitans, sorbides, mannitans and mannides) anhydride partial long-chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the "Pluronics," which are condensates of ethylene oxide with a hydropholic base, formed by condensing propylene oxide with propylene glycol, and the like.

As previously indicated, a protective colloid-forming substance is generally employed during the emulsion polymerization reaction. Included among these materials are polyethers containing at least one ether linkage, and preferably a plurality thereof, such as hydroxymethyl cellulose, hydroxyethyl cellulose, ethyl hydroxyethyl cellulose, ethoxylated starch derivatives, and the like, as well as non-ether protective colloids, e.g., partially and fully hydrolyzed polyvinyl alcohols, natural and syntheic gums, such as gum tragacanth and gum arabic, polyacrylic acid, poly (methyl vinyl ether/maleic anhydride), and the like. All of these materials, whether used singly or in admixture, will be used in the amounts generally found in conventional emulsion polymerization procedures, i.e., in amounts ranging from about 0.1% to about 2% by weight, based on the total weight of the emulsion.

Similarly, the emulsified monomer mixture is polymerized in the usual manner, i.e., by means of a catalytic amount of a conventional free radical polymerization catalyst or catalyst system (which can also be referred to as an addition polymerization catalyst, a vinyl polymerization catalyst or a polymerization initiator), preferably one which is substantially water soluble. Among such catalysts are inorganic peroxides such as hydrogen peroxide, sodium perchlorate and sodium perborate, inorganic persulfates such as sodium persulfate, potassium persulfate and ammonium persulfate, redox systems such as sodium metabisulfite-potassium persulfate, and the like. The total amount of catalyst employed will generally range from about 0.01% to about 3% by weight, based on the total weight of monomer present.

The polymerization reaction will generally be carried out at temperatures ranging from about 0° C. to about 100° C., and preferably at from room temperature (about 25° C.) to about 80° C., for periods of time which can vary from about 2 hours to about 6 hours, and preferably from about 3 hours to about 5 hours, depending on whether the components of the system are all added initially or over an extended period of time, with the possibility, of course, of different temperature ranges within the above-stated broad range being employed in various stages where the components are added incrementally or continuously. The emulsion will preferably be stirred or otherwise agitated during the reaction.

Included among the vinyl esters of straight chain lower alkanoic acids used in preparing the novel copolymers of the present invention are those derived from acids containing less than 9 carbon atoms, e.g., vinyl acetate (which is the preferred monomer of this class), vinyl propionate, vinyl butyrate, vinyl hexanoate, vinyl octanoate, and the like, as well as mixtures thereof. The amount of this monomer employed will usually range from about 15% to about 75% by weight, and preferably from about 30% to about 60% by weight, based on the total weight of monomers used.

The vinyl esters of tertiary alkanoic acids employed in the novel copolymers of the present invention are one or more of the compounds represented by Formula I hereinabove. Included among such esters are vinyl 1,1-dimethyloctanoate, vinyl 1-ethyl-1-methylheptanoate, vinyl 1-methyl-1-n-propylhexanoate, vinyl 1-isopropyl-1-methylhexanoate, vinyl 1,1-diethylhexanoate, vinyl 1-ethyl-1-n-propylpentanoate, vinyl 1-ethyl-1-isopropylpentanoate, vinyl 1,1-diisopropylbutyrate, and the like. Particularly preferred for use in practicing the present invention are mixtures of these various esters, e.g., a mixture of about 50% of vinyl 1,1-dimethyloctanoate, about 35% of vinyl 1-ethyl-1-methylheptanoate and about 15% of either vinyl 1-methyl-1-propylhexanoate or vinyl 1-isopropyl-1-methylhexanoate, or a mixture of these two isomers, said percentages being by weight, based on the total weight of said tertiary acid esters. Ordinarily, from about 20% to about 60% by weight, and preferably from about 30% to about 50% by weight, based on the total weight of monomers used, of one or a mixture of these tertiary acid esters will be used.

The lower alkyl methacrylate used together with the vinyl ester of a straight chain alkanoic acid and the vinyl ester of a tertiary alkanoic acid will be an ester of methacrylic acid with a saturated alkanol, and preferably a straight chain saturated alkanol, containing from 1 to 4 carbon atoms, inclusive, which includes methyl methacrylate, ethyl methacrylate, n-propyl methacrylate, n-butyl methacrylate, and the like, as well as mixtures thereof, with the first of these being preferred. This comonomer will generally be employed in amounts ranging from about 5% to about 25% by weight, and preferably from about 10% to about 20% by weight, based on the total weight of monomers used.

In certain cases, the novel copolymers of the present invention can be prepared by replacing part of the vinyl ester of a straight chain lower alkanoic acid or part of the vinyl ester of the tertiary alkanoic acid, or part of each of these, with one or more different polymerizable. Ethylenically unsaturated comonomers, preferably (although not necessarily) ones have a $H_2C=C<$ group and having a boiling point in excess of about 50° C.

Included among such comonomers are monoethylenically unsaturated aliphatic hydrocarbons such as ethylene, propylene and isobutylene, monoethylenically unsaturated substituted aliphatic hydrocarbons such as vinyl chloride, vinyl bromide and vinylidene chloride, alkyl acrylates such as methyl acrylate, ethyl acrylate, n-propyl acrylate, n-butyl acrylate, isobutyl acrylate and 2-ethylhexyl acrylate, higher alkyl methacrylates, i.e., those wherein the esterifying alcohol has from 10 to 22 carbon atoms, inclusive, such as decyl methacrylate, hendecanyl methacrylate, lauryl methacrylate, tridecanyl methacrylate, myristyl methacrylate, pentadecanyl methacrylate, palmityl methacrylate, stearyl methacrylate, arachidyl methacrylate, behenyl methacrylate, 10-methyl hendecanyl methacrylate and 2-ethyl lauryl methacrylate, aminoalkyl acrylates and methacrylates, e.g., dimethylaminoethyl acrylate, dimethylaminoethyl methacrylate and t-butylaminoethyl methacrylate, and other polymerizable derivatives of $\alpha,\beta$-monoethylenically unsaturated monocarboxylic acids, e.g., acrylonitrile, methacrylonitrile, acrylamide, methacrylamide, N-methylolacrylamide, alkylated N-methylolacrylamides such as N-methoxymethylacrylamide and N - butoxymethylacrylamide, and the like, as well as the unsaturated acids themselves, e.g., acrylic acid, methacrylic acid, crotonic acid, $\alpha$-chloro acrylic acid, $\alpha$-ethylacrylic acid, $\alpha$-propylacrylic acid, $\alpha$-butylacrylic acid, $\alpha$-pentylacrylic acid, $\alpha$-hexylacrylic acid, $\alpha$-cyclohexylacrylic acid, atropic acid, and the like.

In addition, other derivatives of the hypothetical vinyl alcohol, e.g., aliphatic vinyl ethers such as methyl vinyl ether, ethyl vinyl ether and n-butyl vinyl ether, and vinyl ketones such as methyl vinyl ketone, ethyl vinyl ketone and isobutyl vinyl ketone, can also be employed, as can allyl esters of saturated (which includes polymerizably non-reactive unsaturation) monocarboxylic acids, e.g., allyl acetate, allyl propionate and allyl lactate, and alkyl esters of monoethylenically unsaturated dicarboxylic acids, e.g., diethyl maleate, dibutyl maleate, dioctyl maleate, dipropyl fumarate, dibutyl fumarate, dioctyl fumarate, didecyl fumarate, dibutyl itaconate and dioctyl itaconate.

These different comonomers can be used to replace from about 0.5% to about 30% by weight, and preferably from about 10% to about 20% by weight, of the total amount of the aforesaid vinyl ester monomers, and of the monomers which have been replaced, from 0% to about 15% by weight can be a vinyl ester of a straight chain lower alkanoic acid and from 0% to about 15% by weight can be a vinyl ester of a tertiary alkanoic acid.

Obviously, in all cases the amount of comonomers present, whether the vinyl ester of a straight chain lower alkanoic acid, the vinyl ester of a tertiary alkanoic acid and the lower alkyl methacrylate are used alone or together with one or more additional comonomers will total 100%.

When formulating coating compositions containing the novel copolymers of the present invention as resinous binders, conventional amounts of commonly used ingredients, e.g., pigments, fillers, bacteriocides, and the like, will be employed.

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

Example I

An emulsion polymer was prepared using the following materials:

| Material | Function | Parts |
| --- | --- | --- |
| Vinyl acetate | Monomer [1] | 1,070.0 |
| Shell VV10 Monomer (a mixture of monomers of the structure of Formula I above containing about 50% of vinyl 1,1-dimethyloctanoate, about 35% of vinyl 1-ethyl-1-methylheptanoate and about 15% of a mixture of vinyl 1-methyl-1-propylhexanoate and vinyl 1-isopropyl-1-methylhexanoate, having a molecular weight=198.3, a boiling point=60° C. at approximately 1 mm. Hg, a density= 0.8752 g./ml. at 25° C., a refractive index $n_D{}^{25}$= 1.4342, and containing 5 p.p.m. hydroquinone; Shell Chemical Company). | do.[1] | 305.0 |
| Methyl methacrylate | | 152.0 |
| Igepal Co-430 [nonylphenoxypoly(ethyleneoxy)ethanol; Antara Chemicals] | Surfactant | 9.0 |
| Igepal Co-630 [nonylphenoxypoly(ethyleneoxy)ethanol homologous to Igepal Co-430; Antara Chemicals] | do | 15.0 |
| Igepal Co-897 [nonylphenoxypoly(ethyleneoxy)ethanol homologous to Igepal Co-430; Antara Chemicals] | do | 65.4 |
| Igepal Co-977 [nonylphenoxypoly(ethyleneoxy)ethanol homologous to Igepal Co-430; Antara Chemicals] | do | 30.0 |
| Nopco NDW (a blend of mixed hydrocarbons, metallic soaps and 0.5% silicone oil; Nopco Chemical Co., Inc.) | Defoamer | 3.0 |
| Cellosize WP-09 (hydroxyethylcellulose; Hercules Powder Company, Inc.) | Protective colloid. | 21.0 |
| Sodium persulfate | Catalyst | 4.5 |
| Sodium bicarbonate | Buffer | 2.4 |
| Deionized water | | 1,314.0 |

[1] Giving a polymer of 70% vinyl acetate/20% VV10/10% methyl methacrylate.

The procedure employed in carrying out the emulsion polymerization was as follows: The surfactants, defoamer, protective colloid, buffer, half the catalyst, and the water (minus an amount of water sufficient to prepare a 2% solution of the other half of the catalyst) were all charged to a polymerization reactor and sparged with nitrogen gas for 30 minutes at a moderate rate. Next, heat was applied to raise the temperature to 72–74° C., and as this temperature was approached the introduction of the monomers and the aqueous 2% catalyst solution was begun, the former being programmed to run over a four hour period, the latter over a 4 hour and 20 minute period, at 72–74° C. Once the last of the catalyst solution had been added, the reaction mixture was heated to 85° C. and held at that temperature for 30 minutes, after which it was cooled to room temperature and filtered.

A film of the thus-obtained emulsion was coated on a glass plate side-by-side with a vinyl copolymer emulsion considered to be the industry standard for steam and water vapor resistance in semi-gloss paint formulations of this type, and both films were allowed to dry at room temperature. The coated plate was then placed film side down over a vessel of simmering water and let stand until a difference in the films was noted (in all cases in these examples, this usually took from 15 to 30 minutes).

The film obtained from the emulsion of this example was initially very glossy, and had a high degree of transparency. After exposure to the simmering water for a time sufficient to render the control film noticeably darker and duller, the film obtained from the emulsion of this example evidenced only a slight loss of transparency, had good gloss retention, and exhibited only a few cracks in its exposed portion when examined microscopically, and thus was markedly superior to the control film.

Example II

The procedure of Example I hereinabove was repeated in every detail except for the following. The amounts of monomers employed were:

| | Parts |
| --- | --- |
| Vinyl acetate | 840.0 |
| VV10 | 490.0 |
| Methyl methacrylate | 197.0 | giving a polymer of 55% vinyl acetate/32% VV10/13% methyl methacrylate. In addition, a total of 5 parts of sodium persulfate and 2.5 parts of sodium bicarbonate were employed.

A film obtained from the emulsion of this example and tested in the manner described in Example I hereinabove had a high initial gloss and a high degree of transparency. After exposure to the simmering water for a time sufficient to render the control film noticeably darker and duller, the film obtained from the emulsion of this example evidenced only a slight loss of transparency, had very good gloss retention, and showed very few cracks in its exposed portion when examined microscopically, and thus was markedly superior to the control film.

Example III

The procedure of Example I hereinabove was again repeated in every detail except for the following. The amounts of monomers employed were:

| | Parts |
|---|---|
| Vinyl acetate | 534.5 |
| VV10 | 587.2 |
| Methyl methacrylate | 305.4 | giving a polymer of 35% vinyl acetate/45% VV10/20% methyl methacrylate.

A film obtained from the emulsion of this example and tested in the manner described in Example I hereinabove had excellent initial gloss and clarity. After exposure to the simmering water for a time sufficient to render the control film noticeably darker and duller, the film obtained from the emulsion of this example evidenced excellent retention of gloss and clarity, and thus was markedly superior to the control film.

Examples IV-VII

The procedure of Example I hereinabove was repeated in every detail in each of these examples except for the changes noted below.

In Example IV, 305.0 parts of the vinyl acetate were replaced by an equivalent amount of ethyl acrylate, giving a polymer of 50% vinyl acetate/20% ethyl acrylate/20% VV10/10% methyl methacrylate.

In Example V, 152.0 parts of the vinyl acetate were replaced by an equivalent amount of 2-ethylhexyl acrylate, giving a polymer of 60% vinyl acetate/10% 2-ethylhexyl acrylate/20% VV10/10% methyl methacrylate.

In Example VI, 15 parts of the VV10 monomer were replaced by an equivalent amount of acrylic acid, giving a polymer of 70% vinyl acetate/19% VV10/10% methyl methacrylate and 1% acrylic acid.

In Example VII, the amounts of monomers used were:

| | Parts |
|---|---|
| Vinyl acetate | 534.5 |
| VV10 | 435.2 |
| Dioctyl maleate | 152.0 |
| Methyl methacrylate | 305.4 | giving a polymer of 35% vinyl acetate/35% VV10/10% dioctyl maleate/20% methyl methacrylate.

Films obtained from the emulsions of these examples and tested in the manner described in Example I hereinabove had, in every case, high initial gloss and a high degree of transparency. After exposure to the simmering water for a time sufficient to render the control film noticeably darker and duller, the films obtained from the emulsions of these examples evidenced only a slight loss of transparency, had very good gloss retention, and showed very few cracks in their exposed portions when examined microscopically. In each case, then, these films were markedly superior to the control film.

To further illustrate the advantages obtainable by practicing the present invention, the following comparative examples are given. These examples show the preparation and testing of copolymers of vinyl acetate with various comonomers in combinations other than those taught by the present invention.

Example VIII

The procedure of Example I hereinabove was again repeated in every detail except for the following. The amounts of monomers employed were:

| | Parts |
|---|---|
| Vinyl acetate | 1240.4 |
| VV10 | 310.0 | giving a polymer of 80% vinyl acetate/20% VV10. In addition, a total of 3.0 parts of sodium persulfate were employed.

A film obtained from the emulsion of this example and tested in the manner described in Example I hereinabove had very good initial gloss and a high degree of transparency. However, after exposure to the simmering water for a time sufficient to render the control film noticeably darker and duller, the film obtained from the emulsion of this example had a dull, matté appearance and was interlaced with a network of very fine cracks. In addition, the film was very tacky and soft while wet.

Example IX

The procedure of Example I hereinabove was again repeated in every detail except for the following. The amounts of monomer employed were:

| | Parts |
|---|---|
| Vinyl acetate | 1395.4 |
| Methyl methacrylate | 155.0 | giving a polymer of 90% vinyl acetate/10% methyl methacrylate. In addition, a total of 3.0 parts of sodium persulfate were employed.

A film obtained from the emulsion of this example was very turbid and hazy, and thus was totally unsuited for use in a semi-gloss paint.

Example X

The procedure of Example I hereinabove was again repeated in very detail except for the following. The amounts of monomers employed were:

| | Parts |
|---|---|
| Vinyl acetate | 1317.9 |
| 2-ethylhexyl acrylate | 232.5 | giving a polymer of 85% vinyl acetate/15% 2-ethylhexyl acrylate. In addition, a total of 3.0 parts of sodium persulfate were employed.

A film obtained from the emulsion of this example and tested in the manner described in Example I hereinabove had moderate initial gloss (slightly less than the film obtained from the copolymer of Example VIII hereinabove). However, after exposure to the simmering water for a time sufficient to render the control film noticeably darker and duller, the film grew very tacky and soft, even though there was relatively little loss of gloss or transparency when the thus-tested film was dried.

Example XI

The procedure of Example I hereinabove was again repeated in every detail except for the following. The amounts of monomer employed were:

| | Parts |
|---|---|
| Vinyl acetate | 534.5 |
| 2-ethylhexyl acrylate | 687.2 |
| Methyl methacrylate | 305.4 | giving a polymer of 35% vinyl acetate/45% 2-ethylhexyl acrylate/20% methyl methacrylate. In addition, a total of 5.0 parts of sodium persulfate were employed.

A film obtained from the emulsion of this example was very dull, and thus was totally unsuited for use in a semi-gloss paint.

It will be obvious to those skilled in the art that other changes and variations can be made in carrying out the present invention without departing from the spirit and scope thereof as defined in the appended claims.

I claim:
1. A copolymer comprising:
   (1) from about 15% to about 75% by weight of a vinyl ester of a straight chain lower alkanoic acid,
   (2) from about 20% to about 60% by weight of at least one vinyl ester of a tertiary alkanoic acid represented by the general formula:

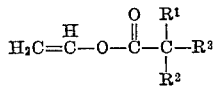

wherein $R^1$, $R^2$, and $R^3$ are each selected from the group consisting of straight and branched chain lower alkyl groups having from 1 to 6 carbon atoms, inclusive, with the sum total of the carbon atoms in the alkyl groups represented by $R^1$, $R^2$, and $R^3$ being 8, and
   (3) from about 5% to about 25% by weight of a lower alkyl methacrylate,
said percentages being based on the total weight of monomers used and the total amount of all comonomers present being 100%.

2. A copolymer as described in claim 1 wherein said (1) is vinyl acetate.

3. A copolymer as described in claim 1 wherein said (2) is a mixture of said vinyl esters of tertiary alkanoic acids.

4. A copolymer as described in claim 1 wherein said (3) is methyl methacrylate.

5. A copolymer as described in claim 1 wherein said (1) is vinyl acetate which is present in an amount ranging from about 30% to about 60% by weight, said (2) is a mixture of said vinyl esters of tertiary alkanoic acids which is present in an amount ranging from about 30% to about 50% by weight, and said (3) is methyl methacrylate which is present in an amount ranging from about 10% to about 20% by weight.

6. A copolymer as described in claim 5 wherein said (2) is a mixture of about 50% of vinyl 1,1-dimethyloctanoate, about 35% of vinyl 1-ethyl-1-methylheptanoate and about 15% of a mixture of vinyl 1-methyl-1-propylhexanoate and vinyl 1-isopropyl-1-methylhexanoate, said percentages being by weight, based on the total amount of said tertiary alkanoic acids.

7. A copolymer as described in claim 1 containing 70% by weight of vinyl acetate, 20% of a mixture of said vinyl esters of tertiary alkanoic acids and 10% of methyl methacrylate.

8. A copolymer as described in claim 1 containing 55% by weight of vinyl acetate, 32% of a mixture of said vinyl esters of tertiary alkanoic acids and 13% of methyl methacrylate.

9. A copolymer as described in claim 1 containing 35% by weight of vinyl acetate, 45% of a mixture of said vinyl esters of tertiary alkanoic acids and 20% of methyl methacrylate.

10. A copolymer comprising a copolymer as described in claim 1 in amounts ranging from about 70% to about 99.5% by weight in combination with about 0.5% to about 30% by weight of at least one polymerizable, ethylenically unsaturated comonomer different from said (1), said (2) and said (3).

11. A copolymer as described in claim 10 wherein said different comonomer is an alkyl acrylate.

12. A copolymer as described in claim 10 wherein said different comonomer is ethyl acrylate.

13. A copolymer as described in claim 10 wherein said different comonomer is 2-ethylhexyl acrylate.

14. A copolymer as described in claim 10 wherein said different comonomer is an $\alpha,\beta$-monoethylenically unsaturated monocarboxylic acid.

15. A copolymer as described in claim 10 wherein said different comonomer is acrylic acid.

16. A copolymer as described in claim 10 wherein said different comonomer is an alkyl ester of a monoethylenically unsaturated dicarboxylic acid.

17. A copolymer as described in claim 10 wherein said different comonomer is dioctyl maleate.

18. A coating composition containing, as the resinous binder, a copolymer as described in claim 1.

References Cited
UNITED STATES PATENTS

| | | | |
|---|---|---|---|
| 3,294,727 | 12/1966 | Grommers et al. | 260—29.6 |
| 3,324,056 | 6/1967 | Vona et al. | 260—17 |
| 3,342,765 | 9/1967 | Oosterhof et al. | 260—23 |

JOSEPH L. SCHOFER, Primary Examiner

C. A. HENDERSON, Jr., Assistant Examiner

U.S. Cl. X.R.

260—29.6, 63, 80.8, 80.81